United States Patent [19]
Kudrevich et al.

[11] Patent Number: 5,889,181
[45] Date of Patent: Mar. 30, 1999

[54] PROCESS FOR THE SYNTHESES OF MONOSULPHONATED PHTHALOCYANINES, NAPHTHOBENZOPORPHYRAZINES AND PORPHYRINS VIA A MODIFIED MEERWEIN REACTION

[75] Inventors: Sveltana V. Kudrevich, Sherbrooke; Hasrat Ali, Deauville; Johan E. Van Lier, North Hatley, all of Canada

[73] Assignee: University Of Sherbrooke, Sherbrooke, Canada

[21] Appl. No.: 519,453

[22] Filed: Aug. 25, 1995

[51] Int. Cl.[6] ............................ C09B 47/00; C09B 62/00; C09D 478/22

[52] U.S. Cl. ............................ 540/131; 540/121; 540/122; 540/145; 540/139; 540/140; 540/136

[58] Field of Search ................................ 540/121, 122, 540/145, 131, 136, 139, 140

*Primary Examiner*—Mukund J. Shah
*Assistant Examiner*—Pavanaram K. Sripada
*Attorney, Agent, or Firm*—Ryan Kromholz & Manion, S.C.

[57] ABSTRACT

Disclosed herein is a selective method for the preparation of single positional isomers of monosulphonated metallo derivatives of compounds selected from the group consisting of monosulphophthalocyanines, monosulphonaphthobenzoporphyrazines and monosulphotetraphenylporphyrins.

8 Claims, 2 Drawing Sheets

& # x 2 0 ; 
PROCESS FOR THE SYNTHESES OF MONOSULPHONATED PHTHALOCYANINES, NAPHTHOBENZOPORPHYRAZINES AND PORPHYRINS VIA A MODIFIED MEERWEIN REACTION

FIELD OF THE INVENTION

The present invention relates to an improved method for the syntheses monosulphonated phthalocyanine, naphthobenzoporphyrazine and porphyrin derivatives as stereospecific isomers in moderate to high yields.

BACKGROUND OF THE INVENTION

Phthalocyanine, naphthobenzoporphyrazine and porphyrin derivatives (Pc's) are blue-green dyes which are photosensitive. These dyes are known as useful for a variety of industrial or bio-medical applications. For example, as photosensitizing agents, these compounds are particularly attractive for in vivo treatment of cancer and the in vitro photoinactivation of viruses in blood products. The effective photoinactivation of *Streptococcus faccium* and *Candida albicans* through damage at the membrane level, mediated by Pc's also suggests their usefulness in sterilization processes. In addition to medical applications, Pc's and their analogues can be useful as photocatalysts (chemically modified electrodes) for energy conversion processes. Another known application is found in the preparation of thin films useful for detecting volatile compounds even at very low concentrations. In this regard, the behaviour of monosulphonated Pc's featuring hydrophobic electron-withdrawing ($F^-$) or electron-donating (t-Bu) substituents in the benzo rings, as in provided by the process of the present invention, are of major interest.

However, one of the most promising application of Pc's remains the photodynamic therapy (PDT) of cancer tumours. PDT is based on the use of a photosensitizing dye, such as Pc's which, upon localization at the tumour site and light activation in the presence of oxygen, produces cytotoxic species, including singlet oxygen, resulting in tumour necrosis.

The amphiphilic nature of Pc derivatives obtained in accordance with the process of the present invention allows them to easily interact with cells membranes which renders the derivatives particularly attractive photosensitizing agents for in vivo photodynamic therapy of cancer. Pc's tend to localize in tumours as opposed to healthy tissues such as muscles, skin, heart and lungs. The larger openings (500–1000 Å in diameter) of tumour capillaries and the larger interstitial area of tumour cells renders tumours more permeable to Pc's than other parts of the body. Hence the Pc's accumulate in tumours. Their capacity to photoinactivate cancer cells in vitro as well as in vivo is well documented and particularly mono/disulphonated, amphiphilic phthalocyanines, chelated with diamagnetic metal ions have been shown capable of inflicting direct tumour cell kill.

One of the major stumbling blocks in the preparation and use of Pc's has been their synthesis methods which has generally complicated, long and result in complex mixtures of compounds requiring difficult purification steps.

Known synthesis routes for the preparation of amphiphilic phthalocyanines mainly consist of one of following two methods:

(i) in situ synthesis of the phthalocyanines macrocycle, i.e. condensation of two differently substituted precursors in the appropriate stoichiometric ratio and (ii) partial sulphonation of substituted metallo phthalocyanines.

These methods can be inconvenient for several reasons. Thus, in the first known method, the syntheses of amphiphilic phthalocyanine via the mixed condensation method requires two types of precursors (hydrophillic and lipophilic), which differ substantially in their physical properties and reactivities, disfavouring selection of optimal reaction conditions and stoichiometry. Furthermore, the complexity of the resulting reaction mixture requires time consuming and tedious chromatographic separation procedures.

The second known method results in even more complex isomeric mixtures due to sulphonation either at 3- and 4-positions of the benzo rings of the phthalocyanine macrocycle. Also, electrophilic substitution requires harsh reaction conditions which may affect substituents, result in demetallation or decomposition of the macrocycle.

Accordingly, there is a great need for an improved process for preparing substantially pure, single positional isomers of phthalocyanines and analogous compounds such as naphtophthalocyanines and porphyrins.

A known method developed by Meerwein and co-workers, useful for converting aromatic amines to sulphonyl chlorides, involves treatment of the diazonium chloride in concentrated hydrochloric acid with sulphur dioxide in acetic acid, using the cupric ion as a catalyst (E. E. Gilbert, *Sulphonation and Related Reactions*, Interscience Publishers, New York, 1965, p. 171). However, the method was not thought to be applicable for the synthesis of Pc's due to the low solubility of the monodiazonium salts of phthalocyanines, naphthobenzoporphyrazines and tetraphenylporphyrins in water (or aqueous acetone).

In the present invention, it was surprisingly found that the Meerwein procedure could be ingeniously modified to accommodate the specific properties of the selected macrocyclic compounds. In accordance with the present invention, suspensions or solutions of monodiazo compounds were used and the completion of the reaction was established empirically. To optimize the use of the monodiazo compounds, the order by which reagents were added was reversed.

SUMMARY OF THE INVENTION

The invention provides a process for the preparation of single positional isomers of monosulphonated metallo derivatives of the following general formula:

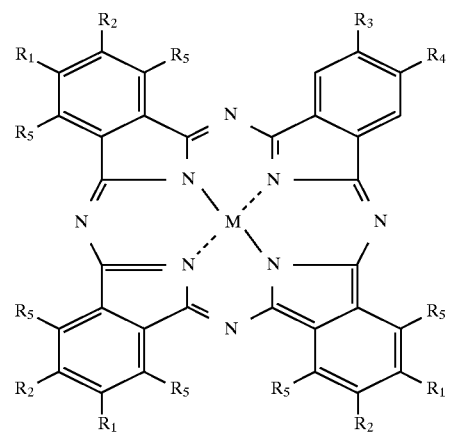

wherein

M is Zn (II), AL(III), Ga(III) and Sn(IV); and wherein the substituents $R_1$ to $R_5$ are selected from the groups consisting of:

$R_1$, $R_2$ and $R_5$ are H, halogen, $Si(CH_3)_3$, and alkyl, $R_3$ and $R_4$ are $SO_3Na$ and $SO_2Cl$;

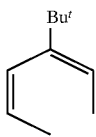

$R_1$, $R_2$ is
$R_3$ and $R_4$ are $SO_3Na$ and $SO_2Cl$ and
$R_5$ is H; and
$R_1$ and $R_2$ are H and $Bu^t$, $R_3$, $R_4$ is

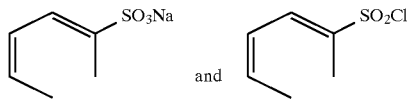

and $R_5$ is H;
and sulphonamides thereof,
said method comprising the steps of:
(a) obtaining a basic macrocycle by condensation of two precursors of similar solubility, one of said precursors containing a lipophilic substituent and the other said precursor containing a nitro group;
(b) converting said basic macrocycle to a monodiazonium salt by reducing the nitro group to an amine group followed by diazotization;
(c) sulphonating the basic macrocycle by mixing a solution containing sulphur dioxide and a cupric ion catalyst to a suspension or solution of said monodiazonium salt to cause a reaction yielding a mixture of compounds including monosulphochlorinated and monochlorinated derivatives;
(d) hydrolysing said mixture, for example, with a base or an acid;
(e) recovering from the hydrolysed mixture the single isomeric monosulphonated compound, wherein said method introduces said sulphonate substituents as the final step in the reaction sequence.

One embodiment of the invention provides a process for the preparation of single positional isomers of monosulphonated metallo derivatives of compounds selected from the group consisting of monosulphophthalocyanines of the following general formula:

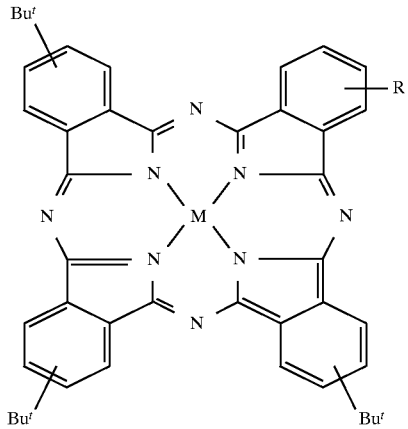

wherein
M is Zn (II), AL(III), Ga(III), Sn(IV); and

R is 3-$SO_3Na$, 4-$SO_3Na$, $SO_2Cl$ and $SO_2NHR$;
monosulphonaphthobenzoporphyrazines of the following general formula:

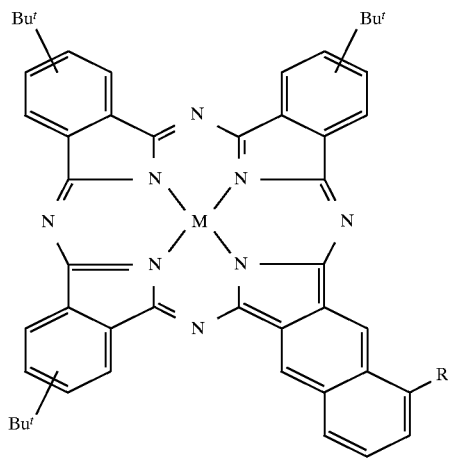

wherein
M is as defined above;
R is $SO_3Na$, $SO_2Cl$ or $SO_2NHR_1$, ($R_1$ is H or alkyl);
and monosulphotetraphenylporphyrins of the following general formula:

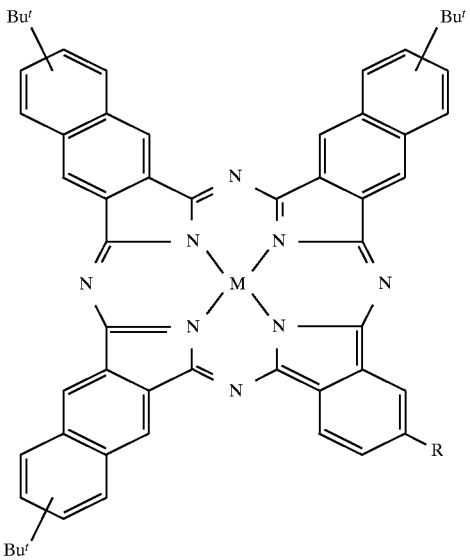

wherein
M is as defined above;
R is $SO_3Na$, $SO_2Cl$ or $SO_2NHR_1$, ($R_1$ is H or alkyl);
and salts and sulphonamides thereof,
said method comprising the steps of:
(a) obtaining a basic macrocycle by condensation of two precursors of similar solubility, one of said precursors containing a lipophilic substituent and the other said precursor containing a nitro group;
(b) converting said basic macrocycle to a monodiazonium salt by reducing the nitro group to an amine group followed by diazotization;
(c) sulphonating the basic macrocycle by mixing a solution containing sulphur dioxide and a cupric ion catalyst to a suspension or solution of said monodiazonium salt to cause a reaction yielding a mixture of compounds including monosulphochlorinated and monochlorinated derivates;

(d) hydrolysing said mixture;

(e) recovering from the hydrolysed mixture the single isomeric monosulphonated compound, wherein said method introduces said sulphonate substituents as the final step in the reaction sequence.

Another embodiment of the invention provides a process for the preparation of single positional isomers of monosulphonated metallo derivatives of compounds selected from the group consisting of monosulphophthalocyanines of the following general formula:

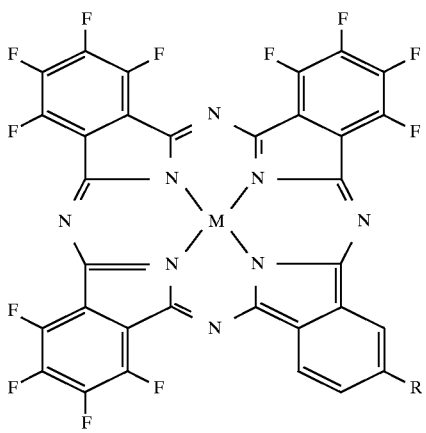

wherein

M is Zn (II), AL(III), Ga(III), Sn(IV); and

R is 3-$SO_3Na$, 4-$SO_3Na$ and $SO_2Cl$;

and salts thereof, said method comprising the steps of:

(a) obtaining a basic macrocycle by condensation of two precursors of similar solubility, one of said precursors containing a lipophilic substituent and the other said precursor containing a nitro group;

(b) converting said basic macrocycle to a monodiazonium salt by reducing the nitro group to an amine group followed by diazotization;

(c) sulphonating the basic macrocycle by mixing a solution containing sulphur dioxide and a cupric ion catalyst to a suspension or solution of said monodiazonium salt to cause a reaction yielding a mixture of compounds including monosulphonated and monochlorinated derivates;

(d) hydrolysing said mixture;

(e) recovering from the hydrolysed mixture the single isomeric monosulphonated compound, wherein said method introduces said sulphonate substituents as the final step in the reaction sequence.

Another embodiment of the invention provides a process for the preparation of single positional isomers of monosulphonated metallo derivatives of compounds selected from the group consisting of monosulphotetraphenylporphyrins of the following general formula:

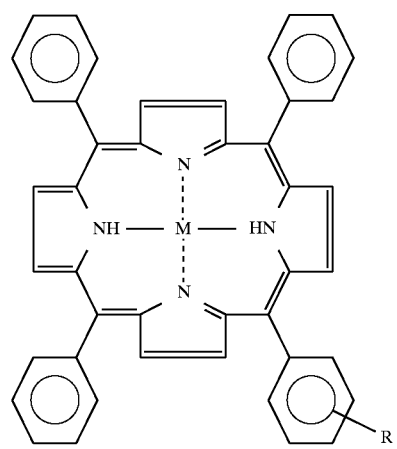

wherein

M is HH or Zn (II); and

R is 2-, 3- or 4-$SO_3Na$, $SO_2Cl$ and $SO_2NHR$;

and salts or sulphonamides thereof, said method comprising the steps of:

(a) obtaining a basic macrocycle by condensation of the benzaldehyde and appropriate nitrobenzaldehyde with pyrrole;

(b) converting said basic macrocycle to a monodiazonium salt by reducing the nitro group to an amine group followed by diazotization;

(c) sulphonating the basic macrocycle by mixing a solution containing sulphur dioxide and a cupric ion catalyst to a suspension or solution of said monodiazonium salt to cause a reaction yielding a mixture of compounds including monosulphonated and monochlorinated derivates;

(d) hydrolysing said mixture;

(e) recovering from the hydrolysed mixture the single isomeric monosulphonated compound, wherein said method introduces said sulphonate substituents as the final step in the reaction sequence.

Other features and advantages of the invention will become apparent to those of ordinary skill in the art upon review of the following detailed description, claims, and drawings.

DETAILED DESCRIPTION OF THE INVENTION

Figure 1:
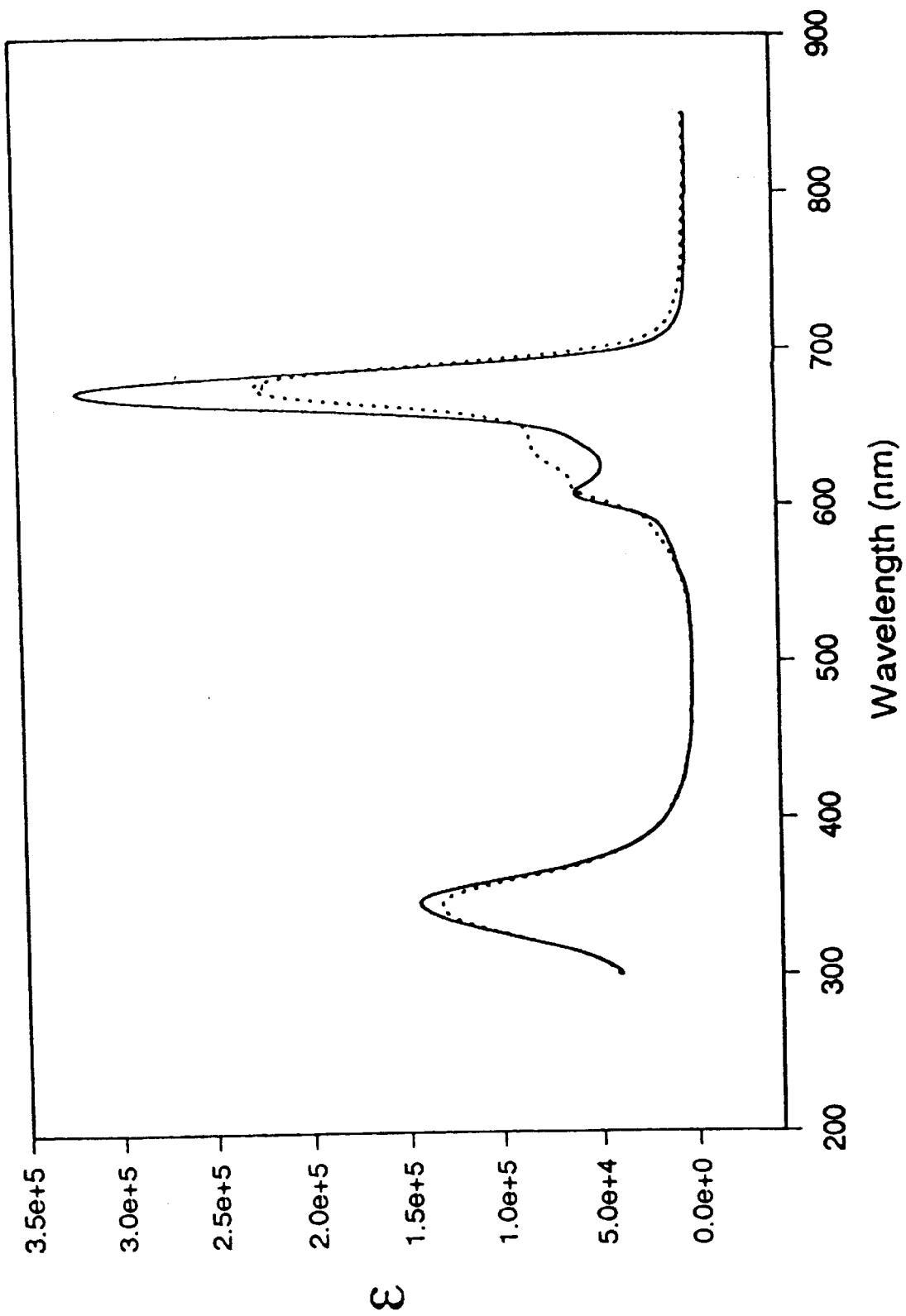
FIG. 1 is a UV-vis spectra representation of compounds synthesized in accordance to the process of the present invention, more specifically the spectra of the following compounds are shown: tris(t-butyl)-monosulphophthalocyanines in methanol, compound 5a shown in dotted lines (- - -) and compound 5b shown in solid lines (-)

For illustrative purposes, a variety of monosulphonated phthalocyanine, naphthobenzoporphyrazine and porphyrin derivatives were prepared as single positional isomers in moderate to high yield in accordance with the present invention by using modified Meerwein reaction conditions. These amphiphilic dyes have shown potential application in various fields and particularly as photosensitizers in the photodynamic therapy of cancer and photosensitive sterilizing agents in the preparation of blood products.

Hence, various amphiphilic photosensitizers were prepared as essentially pure isomeric compounds, featuring both lipophilic and hydrophillic substituents at selected positions of the chromophore. In order to avoid the problems associated with the prior art, i.e. with reacting incompatible hydrophillic and lipophilic precursors, sulphonate substituents were introduced onto the macrocycle as the final step in the reaction sequence, using a variation of the Meerwein procedure. For illustrative purposes and without limiting the foregoing, the process of the present invention was used in the synthesis of various monosulphonated porphyrins, phthalocyanines and naphthobenzoporphyrazines.

In a preferred embodiment, the basic macrocycle was obtained by the condensation of two different precursors of similar solubili y, one featuring the selected lipophilic substituent and the other containing a nitro group. This step is well known to those skilled in the art and examples of suitable reaction conditions will be provided hereinbelow.

The subsequent step consists in the reduction of the nitro to an amine group. Finally, a variation of the Meerwein procedure was used to introduce the sulpho group.

The applicability of the Meerwein procedure to a prepare certain compounds is well documented and its partial application in the synthesis of Pc's of the present invention was demonstrated by converting zinc tris(4-t-butyl)-4-aminophthalocyanine* (4a) to the zinc tris(4-t-butyl)-4-sulphophthalocyanine (5a).

*The original phthalonitrile numbering was retained.

Subsequently, there was prepared a series of monoamino derivatives of different phthalocyanines, tetraphenylporphyrins and naphthobenzoporphyrazines featuring various central metal atoms and macroring substituents. The choice of substituents was guided by the PDT potential of the final product and adequate solubility of the monoamine intermediate to allow for uncomplicated chromatographic purification. In addition to the 4-sulphophthalocyanine (5a) there was also prepared the analogous 3-sulphophthalocyanine (5b) which permitted to evaluate the distinct chromatographic and biological properties of these closely related structures. Using the conventional condensation method there was prepared the zinc hexadecafluorophthalocyanine and the mixed 3- and 4-isomers of the zinc dodecafluoromonosulphophthalocyanine analogue. In view of the good photodynamic properties of these derivatives the single isomeric zinc dodecafluoro-4-sulphophthalocyanine (21) was also prepared in accordance with the present invention.

Naphthobenzoporphyrazines, which can be considered as hybrid structures composed of both phthalocyanine and naphthalocyacine moieties, and which have recently been reported as effective sensitizers for tumour cell and virus inactivation, were also prepared in accordance with the process of the present invention. The prior art had shown that monosulphonate derivatives of naphthobenzoporphyrazines had low activity due to their strong tendency to aggregate. In order to enhance solubility and reduce aggregation of monosulphonate derivatives, the process of the present invention was applied to prepare monosulphonaphthobenzoporphyrazines substituted with three t-butyl groups and one sulphonate group either on the benzo (10) or naphtho (15) ring.

EXPERIMENTAL

Materials and methods

FAB-MS were obtained on a LG Autospec Q mass spectrometer from the Department of Chemistry, University of Montreal. High resolution DIP mass spectra (HR-MS) were obtained on a V9 Micro-mass Model ZAB-1F apparatus at 70 eV ionization voltage. $^1$H NMR spectra were taken on a Bruker AC-300 (300 MHz) spectrometer. UV-vis spectra were recorded with a Hitachi U-2000 spectrophotometer.

Preparative chromatography was done on 70–230 mesh silica gel (Aldrich). TLC was performed on 0.25 mm thick POLYGRAM SIL G/UV$_{254}$. plates (Macherey-Nagel, Germany). Analytical HPLC was conducted on a 0.94×25 cm column (CSC, Montreal) packed with ODS-2, C-18 reversed phase particles and operated with a linear gradient from 100% aqueous sodium phosphate buffer (pH 7) to 100% methanol over 25 min, followed by isocratic elution with 100% methanol for 10 min, at 1.5 ml/min. Eluting phthalocyanines (Pc's) and naphthobenzoporphyrazines (NBP's) were detected by their absorbance at 670–700 nm, porphyrins at 410 nm.

The following materials were obtained from a commercial source: 4-t-butyl-phthalonitrile, 4-nitrophthalonitrile (TCI America), tetrafluorophthalonitrile, 4-t-butyl-o-xylene, fumarodinitrile, o-, m-, p-nitrobenzaldehydes, pyrrole (Aldrich). All solvents were HPLC grade and were used without further purification unless otherwise noted. Anhydrous grade sulphur dioxide was purchased from Canadian Liquid Air Ltd and was used as supplied.

The following products were prepared by published methods:

3-Nitrophthalonitrile, described in: "J. Griffiths and B. Roozpeikar, *J. Chem. Soc., Perkin Trans.* 1, 1976, 42", by dehydration of the appropriate nitrobenzenedicarboxamide.

5-Nitro-2,3-dicyanonaphthalene, described in "E. I. Kovshev and E. A. Luk'yanets, *Zh. Obshch. Khim.*, 1972, 42 (7), 1593 ", by nitration of 2,3-dicyanonaphthalene with a mixture of KNO$^3$ and H$_2$SO$_4$ at −10° C.

4-Aminophthalonitrile, described in: "C. R. Rasmussen, J. F. Gardecki, J. N. Plampin, B. L. Twardzik, B. E. Reynolds, A. J. Molinari, N. Schwartz, W. W. Bennettz, B. E. Price and J. J. Markowski, *J. Med. Chem.*, 1978, 21, 1044 ", by hydrogenation of 4-nitrophthalonitrile with 10% palladium on charcoal in 95% aqueous ethanol.

4-Acetamidophthalonitrile, described in: "P. J. Brach, S. J. Grammatica, O. A. Osanna and L. Weinberger, *J. Heterocycl. Chem.*, 1970, 7 (6), 1403", by acetylation of 4-aminophthalonitrile with acetylchloride in pyridine.

6-t-Butyl-2,3-dicyanonaphthalene, described in: "E. I. Kovshev, V. A. Puchnova and E. A. Luk'yanets, *J. Org. Chem. USSR (Engl. Transl.)*, 1971, 7, 364 ", by condensation of 4-t-butyl-α, α, α', α'-tetrabromo-o-xylene with fumarodinitrile in dimethylformamide containing sodium iodide.

5-(3-Nitrophenyl)-10,15,20-triphenylporphyrin (mono-m-nitro TPP), described in: "Y. Sun, A. Martell, M. Tsutsui, *J. Heterocycl. Chem.*, 1986, 23, 561 ".

5-(4-nitrophenyl)-10,15,20-triphenylporphyrin (mono-p-nitro TPP), described in: "K. Arishima, T. Matsuura, H. Tsuchida and J. Shigevara, Jap P 60 188 405/1984".

5-(2-nitrophenyl)-10.15.20-triphenylporphyrin (mono-o-nitro TPP), described in: "J. P. Collman, J. I. Braumann, K. M. Doxsee, T. R. Halbert, E. Bunnenberg, R. E. Linder, G. E. La Mar, J. Del Gaudio, G. Lang and K. Spartalian, *J. Am. Chem. Soc.*, 1980, 102 (12), 4182", by mixed condensation of benzaldehyde, appropriate nitrobenzaldehyde (in molar ratio 2:1) and pyrrole in glacial acetic acid, followed by chromatographical purification of the desired product.

5-(3-Aminophenyl)-10,15,20-triphenylporphyrin (mono-m-amino TPP), described in: "Y. Sun et al, supra".

5-(4-aminophenyl)-10,15,20-triphenylporphyrin (mono-p-amino TPP), described in: "W. J. Kruper, Jr., T. A. Chamberlin and M. Kochanny, *J. Org. Chem.*, 1989, 54, 2753".

5-(2-aminophenyl)-10,15,20-triphenylporphyrin (mono-o-amino TPP), described in: "J. P. Collman et al, supra", by reduction of the corresponding mononitro TPP with tin(II) chloride dihydrate in concentrated hydrochloric acid.

EXAMPLE 1
Preparation of Zinc tris(4-t-butyl)-4-nitrophthalocyanine (3a)

A mixture of 0.519 g (3 mmol) of 1a, 1.656 g (9 mmol) of 2 and 2.34 g (12 mmol) of zinc acetate dihydrate was heated at 160° C. for 3 h. Chromatography of the acetone extract on silica gel in toluene-ethylacetate (9:1) furnished the compound 3a as a dark-blue solid, 0.242 g (10.2% based on 1a): $R_f$ 0.84; FAB-MS m/z 790 (82%, M$^+$, $^{64}$Zn), 792 (100%, M$^+$, $^{66}$Zn), 794 (64%, M$^+$, $^{68}$Zn); $\lambda_{max}$ (DMF)/nm (1 g $\epsilon$) 705 (4.64), 672 (4.89), 609 (4.3), 349 (4.56).

EXAMPLE 2
Preparation of monoaminophthalocyanines and monoaminonaphthobenzoporphyrazines.

Condensation of 4-nitrophthalonitrile (1a or 1b) and 4-t-butylphthalonitrile (2) with zinc acetate (molar ratio 1:3:4; 3 h; 160° C.) gave a mixture of mono- through tetranitrophthalocyanine derivatives. The reaction mixture was brought to dryness on a vacuum, dissolved in DMF and treated with Na$_2$S.9H$_2$O to yield a mixtures of mono- and polyaminophthalocyanines (55–65% yield for the zinc complexes and 95% yield for the more stable copper complexes). Unlike the nitrophthalocyanines, the more polar amino derivatives are easily separated on a silica gel column, providing the pure tris (4-t-butyl)-monoaminophthalocyanines 4b and 4c. The analogues naphthobenzoporphyrazines 9 and 14 were prepared in a similar manner. Identity of the final products was established by FAB-MS and UV-vis spectroscopy. Compounds 4a–c exhibit a deep greenish blue colour. The addition of one auxochromic amino group per molecule induces a weak bathochromic shift of the absorption maxima in the red end of the spectrum. Perturbation of the symmetry of the aromatic ring systems in the case of the monoaminonaphthobenzoporphyrazines, combined with the effect of the added amino group, results in further characteristic shifts of the absorption maxima (Table 1).

The synthesis of the zinc dodecafluoro-4-aminophthalocyanine (20) was complicated by difficulties encountered in reducing the nitro substituent. Sodium sulphide induces a nucleophilic substitution of the F atoms in a similar manner as reported for the thiylation of 18 with PhS (see: "J. M. Birchall, R. N. Haszeldine and J. O. Morley, *J. Chem. Soc.* C, 1970, 456"). Whereas other reducing agents tested, including acidic solutions of tin(II) chloride and titanium(III) chloride, induced decomposition of the zinc complex. Attempts to affect direct condensation of 4-aminophthalonitrile likewise did not give the appropriate phthalocyanine. Thus, we modified the procedure by first protecting the amino group in 4-aminophthalonitrile as an acetamido group (i.e. compound 17), followed by a mixed condensation with tetrafluorophthalonitrile (18) to yield the mono-4-acetamido derivative 19. Compound 20 was subsequently obtained by acidic hydrolysis of 19.

EXAMPLE 3
Preparation of monosulphonatophthalocyanines, -naphthobenzoporphyrazines and-tetraphenylporphyrins.

The method developed by Meerwein and co-workers for converting aromatic amines to sulphonyl chlorides involves treatment of the diazonium chloride in concentrated hydrochloric acid with sulphur dioxide in acetic acid, using the cupric ion as a catalyst. Surprisingly, we were able to ingeniously modify the procedure to accommodate the specific properties of the selected macrocyclic compounds. Due to the low solubility of the monodiazonium salts of phthalocyanines, naphthobenzoporphyrazines and tetraphenylporphyrins in water (or aqueous acetone), we used suspensions or solutions in other media and established the completion of the reaction empirically. To optimize the use of the monodiazo compounds, we reversed the order by which reagents were added. For example, a solution of sulphur dioxide in acetic acid mixed with a solution of the catalyst, was added rapidly and with intense stirring to a cold suspension of zinc tris(4-t-butyl)-4-monodiazophthalocyanine, freshly prepared from 4a. Vigorous evolution of nitrogen, indicative of the reaction, started immediately. Precipitated material contained 55% of zinc tris(4-t-butyl)- 4-chlorosulphonylphthalocyanine and 25% of the monochloro derivative 6 u as a side product resulting from a competitive reaction of SO$_2$ and Cl$^-$ with Ar$^+$. This mixture was hydrolysed in 1N NaOH. The resulting monosulphonate 5a was easily separated from the monochloro derivative 6a by chromatography on a short silicagel column and characterized by the combustion analyses data and by its physico-chemical properties. Dissolved in methanol, this compound is largely monomeric. The oxidative degradation of compound 5a followed by HPLC analysis[9] gave a sulphophthalamide/t-butylphthalamide ratio of 1:3.

The monosulphophthalocyanines 5b and c, the monosulphonaphthobenzoporphyrazines 10 and 15, and the monosulphotetraphenylporphyrins 24a–c were obtained by the same procedure. All sulphochlorination products were hydrolysed with 1N NaOH prior to the separation of the final products by silica gel chromatography. However, it is to be understood that any other hydrolysation methods could be used, such as for example, acid hydrolysis, with, for example, HCl. In the results, the ratio between the monosulphonate and monochloro compounds was shown to depend strongly on the type of precursor used, suggesting a dominant role of steric factors in the reaction mechanism (Table 3). Thus, the ratio between the 4-sulpho- and 4-chlorophthalocyanines 5a and 6a was about 2:1, whereas in the case of the analogous 3-sulpho-and 3-chlorophthalocyanines 5b and 6b, the latter was the major product. Furthermore, the relative amount of monosulphotetraphenylporphyrins versus the corresponding monochloro analogues was about 5:1 for the p-substituted 24a and 25c, 2:1 for the m-substituted 24a and 25a and only 1:1 for the o-substituted 24b and 25b, reflecting the effect of the various degrees of steric hindrance on the reaction.

The degree of sulphonation of the monosulphonated products was confirmed by analytical reversed phase HPLC. In all cases we observed a single peak with retention time around 30 min which is characteristic for the monosulphonato derivatives. It should be noted however, that even when single HPLC peaks were observed, unresolved type isomers could be present for compounds 5a–c, 10 and 15, as evidenced by the broad $^1$H NMR signals of the purified samples.

It is obvious that due to the general symmetry of dodecafluoro-phthalocyanine and tetraphenylporphyrin, compounds 21, 24a–c and 26, were obtained as single positional isomeric products.

All monosulphonates, with the exception of compound 10, are easily soluble in methanol. We observed a distinct difference in spectral properties between zinc phthalocyanines sulphonated at the 4- or 3-position (5a vs. 5b). Compound 5b appears to be more aggregated in methanol than 5a as demonstrated by the broadening and lower molar extinction of the Q-band (FIG. 1, Table 2).

Figure 2:
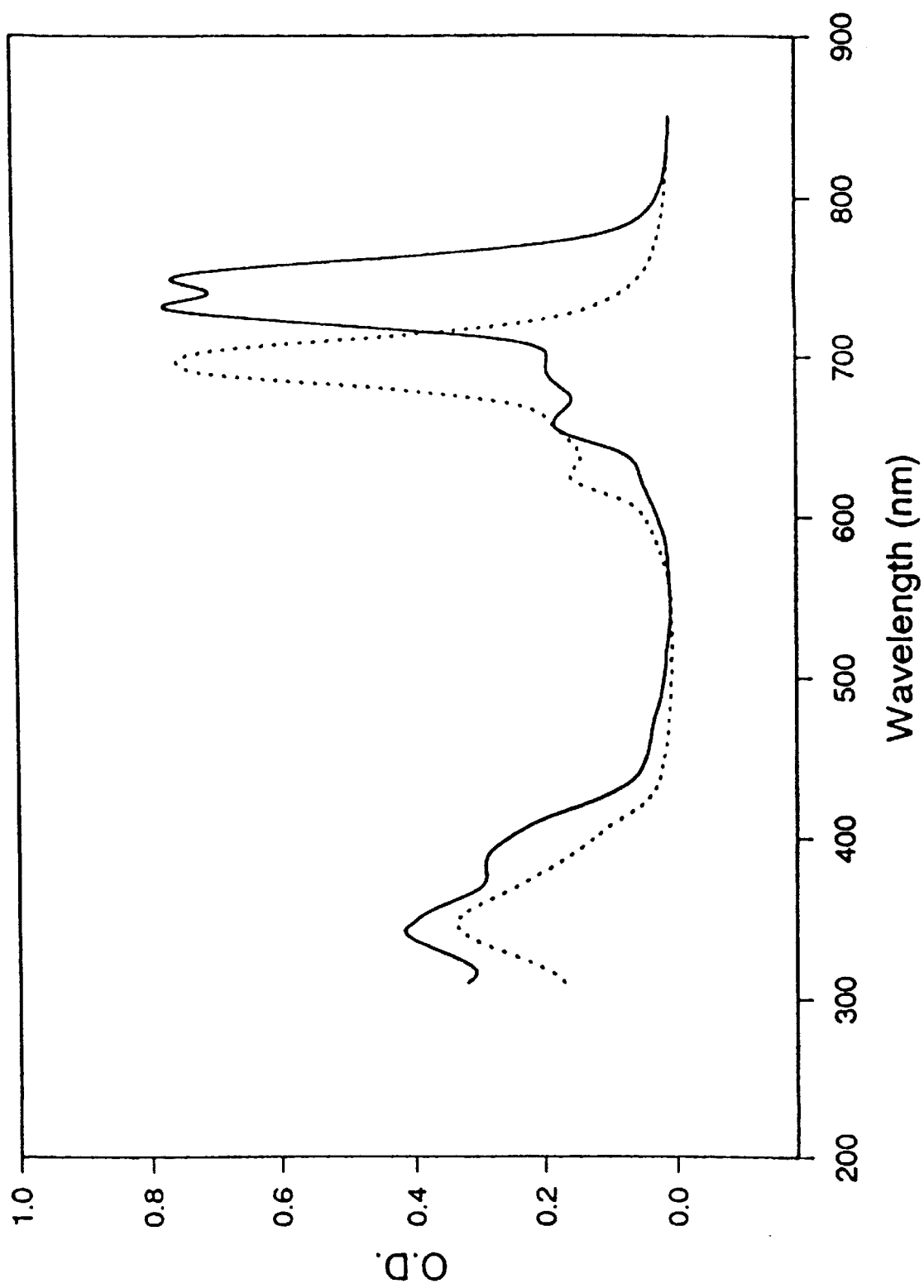
FIG. 2 is a Uv-vis spectra representation of compounds synthesized in accordance to the process of the present invention, more specifically the spectra of the following compounds are shown: monosulphonaphthobenzoporphyrazines in DMF, compound 10 shown in dotted lines (- - -) and compound 15 shown in solid lines (-).

The split maxima in the electronic spectra of the monosulphonaphthobenzoporphyrazine 10 in DMF at 751 nm and 733 nm are indicative of the asymmetrical character of this compound. When one of the four benzo groups in zinc tetra(t-butyl)phthalocyanine is replaced by a 5-sulphonaphtho group (15), only one major absorbtion maximum is observed around 690 nm. This band is red-shifted relative to that of the corresponding zinc phthalocyanine (FIG. 2, Table 2). The presence of a symmetric, single absorption maximum, suggests that both the molecular asymmetry and the substituents exert a synergistic effect on the absorption properties of the phthalocyanine derivatives. Similarly, the naphthobenzoporphyrazine 10, featuring three naphtho groups and one sulphobenzo group, would be expected to have spectral properties resembling those of the corresponding zinc naphthalocyanine. Instead, we observed two bands in the naphthalocyanine absorption region (FIG. 2, Table 2). This observation is however in agreement with the two-fold orbital degeneracy of the excited electronic state of the metallophthalocyanines when the group of symmetry of the molecule varies from $D_{4h}$ (zinc naphthalocyanine) to $C_{2v}$ (i.e. as in 10). Our spectral data of the monosulphonate 10 are similar to those reported in "P. Margaron, R. Langlois, J. E. van Lier and S. Gaspard, *J. Photochem. Photobiol., B: Biology*, 1992, 14, 187" for the analogous, unsubstituted aluminum monosulphobenzotrinaphthoporphyrazine.

EXAMPLE 4

Monoaminophthalocyanines (4a–c) and monoaminonaphthobenzoporohyrazines (9 and 14) obtained by reduction of mononitro derivatives. —In a typical reaction, a powdered mixture of t-butyl substituted 2,3-dicyanonaphthalo or phthalonitrile 2 or 7 (3 mmol), nitro derivatives 1a, 1b or 12 (1 mmol) and metal salt (4 mmol) was heated for 3–4 h at 160°–190° C. All soluble components were extracted from the reaction mixture with chloroform/acetone and after evaporation of the solvent the crude mixture of mono- and polynitrophthalocyanines was reduced with a 3-fold excess of $Na_2S.9H_2O$ in DMF/THF at 60° C. The reaction mixture was diluted with water, the solids were filtered, washed with water, air dried, redissolved in acetone and chromatographed on silica gel, using different solvents (Table 1), to yield the monoaminophthalocyanines 4a–c (dark-blue crystals), monoaminonaphthobenzoporphyrazines 9 (greenish-blue crystals) and 14 (dark-green crystalline solid) (Table 1).

EXAMPLE 5

Zinc dodecafluoro-4-acetamidophthalocyanine (19). —A mixture of 200 mg (1.1 mmol) of 17, 650 mg (3.3 mmol) of 18 and 858 mg (4.4 mmol) of zinc acetate dihydrate was heated to 200°–220° C. for 4 h. All soluble components were extracted from the reaction mixture with acetone. The solvent was evaporated and the residue was chromatographed on silica gel in toluene-ethylacetatepyridine (1:1:0.1) to yield 19 as red-blue crystals (17%): $R_f$, 0.36; FAB-MS m/z 850 (M$^+$, 100%); $\lambda_{max}$ (DMF)/nm (1 g $\epsilon$) 681 (4.92), 358 (4.54).

EXAMPLE 6

Zinc dodecafluoro-4-aminophthalocyanine (20)

A suspension of compound 19 in 5M hydrochloric acid was refluxed for 12 h. The precipitate was collected by filtration, washed with 0.1N solution of NaOH and water and air dried. The crude product was chromatographed on silica gel. Elution with ethylacetate gave 86% of compound 20 (dark-blue powder) ($R_f$ 0.26). Found: 47.60% C, 1.34% H. Clcd. for $C_{32}H_5N_9F_{12}Zn$: 47.52% C, 0.62% H. FAB-MS m/Z 807 (M$_+$); $\lambda_{max}$ (DMF)/nm (1 g $\epsilon$) 682 (4.90), 358 (4.68).

EXAMPLE 7

Sodium salts of monosulphophthalocyanines. monosulphonaphthobenzoporphyrazines and 10,15,20-triphenyl-5-sulphophenvlporphyrins (Table 2), and the corresponding monochloro and chlorophenyl derivatives (Table 3). —In a typical experiment, a suspension of 0.5 mmol of monoamino compound in 20 ml of concentrated hydrochloric acid and 1 ml of acetone was cooled to 0°–5° C. A solution of 38 mg (0.55 mmol) of sodium nitrite in 1–2 ml of $H_2O$ was added dropwise with stirring, while the temperature of the mixture was kept at 0° C. stirring was continued at 0° C. for 45 min to complete the reaction. To the resulting monodiazonium salt suspension was simultaneously added, under vigorous stirring, (i) a solution of 30 mg of copper(II) chloride dihydrate in 1 ml of $H_2O$ and (ii) 2 ml of glacial acetic acid saturated with sulphur dioxide (0° C.). After nitrogen evolution ceased, the mixture was maintained at 0° C. for an additional 15 min, diluted with water whereafter the precipitate was collected by suction filtration, washed with cold water and suspended in 20 ml of 1N NaOH. This suspension was stirred at 60° C. for 1 h, allowed to cool, filtered to yield a solid which was repeatedly washed with water, air dried and chromatographed on silica gel. Elution with toluene—ethylacetate (5:1) gave the monochloro compounds 6a–c, 22 (dark-blue solid), 11 (dark-green solid), 16 (dark-greenish-blue powder), 25a–c (purple powder), whereas subsequent elution with methanol gave the pure monosulphonates 5a–c, 21 (dark-blue crystals), 10 (dark-green crystals), 15 (dark greenish-blue crystals), 24a–c (purple crystalline solid). Reversed phase HPLC analysis of the latter compounds revealed a single peak in each case.

EXAMPLE 8

Zinc 10,15,20-trirhenyl-5-(3-sulphophenyl)porphyrin (26)

A solution of compound 24a in methanol was refluxed with excess of zinc acetate dihydrate for 0.5 h. The solvent was evaporated and the residue was chromatographed on silica gel. Elution with methanol gave compound 26 as purple crystals (98%): ($R_f$ 0.88): Found: 61.35% C, 3.93% H, 7.38% N, 3.64% S. Clcd. for $C_{44}H_{37}N_4NaO_7SZn.4H_2O$: 61.87% C, 4.37% H, 6.56% N, 3.75% S. FAB-MS m/z 781 (M$_+$); $\lambda_{max}$ (MeOH)/nm (1 g $\epsilon$) 596 (2.84), 556 (3.32), 421 (4.78), 310 (3.35), 230 (3.0).

TABLE 1

Monoaminophthalocyanines obtained from mononitrophthalocyanines.

| No. | Synthesis Condensation conditions: metal salt employed, reaction temperature | Reduction conditions: solvent, time, yield | Conditions of chromatographical purification: eluent, $R_f$ | Molecular formula | FAB-MS | $\lambda_{max}$ DMF/nm (lg ϵ) |
|---|---|---|---|---|---|---|
| 4a | Zn (OAc)$_2$—2H$_2$O, 160° C. | DMF, 2 h, 65% | Toluene—ethylacetate 5:1, 0.72 | C$_{44}$H$_{41}$N$_9$Zn | 760 (M$^+$) | 682(5.35), 6.17(4,68), 351(4.95), 285(4.61) |
| 4b | Zn (OAc)$_2$—2H$_2$O, 160° C. | DMF, 2 h, 68% | Toluene—ethylacetate 5:1, 0.7 | C$_{44}$H$_{41}$N$_9$Zn | 760 (M$^+$) | 682(5.28), 6.17(4.60), 350(5.0) |
| 4c | CuCl, 180° C. | THF, 1 h, 95% | Toluene—THF 3:1, 0.89 | C$_{44}$H$_{41}$CuN$_9$ | 759 (M$^+$) | 681(5.4), 617(4.7), 350 (5.0) |
| 9 | Zn (OAc)$_2$—2H$_2$O, 190° C. | DMF, 2 h, 55% | Ethylacetate 0.88 | C$_{56}$H$_{47}$N$_9$Zn | 911 (M$^+$) | 770(5.25), 724(5.05), 698(4.95), 648(4.55), 390(4.83) |
| 14 | Zn (OAc)$_2$—2H$_2$O, 225° C. | DMF, 2 h, 60% | Toluene—ethylacetate 9:1, 0.44 | C$_{48}$H$_{43}$N$_9$Zn | 811 (M$^+$) | 706(5.21), 347(4.87) |

TABLE 2

Phthalocyanine monosulphonate sodium salts and 10,15,20-triphenylporphyrine-5-(phenylsulphonate) sodium salts.

| No. | Yield | HPLC analysis: $t_g$.min | Molecular formula | FAB-MS, m/e | $\lambda_{max}$ nm (lg ϵ) [solvent] | $^1$H-NMR δ, ppm, [solvent] |
|---|---|---|---|---|---|---|
| 5a | 55% | 30.8 | C$_{44}$H$_{39}$N$_8$NaO$_3$SZn | 848 (M$^+$) | 674(5.5), 607(4.8), 347 (5.16) [methanol] | 9.63(s, 3-sulphobenzo), 9.45–9.2 (m, 3,5-t-Bu-benzo, 5-sulphobenzo), 8.46(d, 6-sulphobenzo), 8.36–8.26(m, 6-t-Bu-benzo), 1.75(s, t-Bu), [DMSO-d$_6$] |
| 5b | 37% | 30.7 | C$_{44}$H$_{39}$N$_8$NaO$_3$SZn | 848 (M$^+$) | 676(5.48), 608(4.79), 345(5.14), [DMF], 675 (5.36), 345(5.03) [methanol] | 9.75(broad, 4-sulphobenzo), 9.55–9.2(m, 5-sulphobenzo, 3,5-t-Bu-benzo), 8.6(d, 6-sulphobenzo), 8.35–8.25(m, 6-t-Bu-benzo), 1.75(s, t-Bu) [DMSO-d$_6$] |
| 5c | 60% | 29.2 | C$_{44}$H$_{39}$CuN$_8$NaO$_3$S | 846 (M$^+$) | 675(5.56), 608(4.82), 346(5.11) [DMF] | |
| 10 | 42% | 31.2 | C$_{56}$H$_{45}$N$_8$NaO$_3$SZn | 998 (M$^+$) | 751(5.20), 733(5.21), 658(4.56), 343(4.92) [DMF] | 9.8(broad, 3,5-sulphobenzo), 8.4 (m, 6-sulphobenzo), 8.2(m, 6-t-Bu-naphtho), 8.0(broad, 4.7-t-Bu-naphtho), 7.85(m, 3.8-t-Bu-naphtho), 1.8(s-t-Bu) [DMSO-d$_6$] |
| 15 | 52% | 30.6 | C$_{48}$H$_{41}$N$_8$NaO$_3$SZn | 897 (M$^+$) | 698(5.48), 628(4.8), 348(5.12) [DMF] 6.93(5.45), 343(5.23) [methanol] | 10.89(d, 5-sulphonaphto), 10.05–9.95(dd, 6,7-sulphonaphtho), 9.5–9.25(m, 3,5-t-Bu-benzo), 8.7(m, 3-sulphonaphto), 8.4–8.25(m, 6-t-Bu-benzo), 7.8 (m, 8-sulphonaphtho), 1.75(s, t-Bu) [DMSO-d$_6$] |
| 21 | 45% | 30.4 | C$_{32}$H$_3$F$_{12}$N$_8$NaO$_3$SZn | 874 (M$^+$) | 633, 344/1:1/[methanol] 675(5.10), 356(4.92) [DMF] | |
| 24a | 60% | 29.1 | C$_{44}$H$_{29}$N$_4$NaO$_3$S | 717 (M$^+$) | 645(3.52), 588(3.56), 542(3.85), 512(4.11), 412(5.44), 304(4.11) [methanol] | 8.54–8.84(m+S, 8H, β-pyrrole), 8.19–8.30(m, 6H, H$^o$-triphenyl), 7.66–7.85(m, 9H, H$^m$, H$^p$-triphenyl), 7.45–7.55(m, 4H, 2H$^o$, H$^m$, H$^p$-sulphonatophenyl) [methanol-d$_4$] |
| 24b | 38% | 30.630.6–29.1 | C$_{44}$H$_{29}$N$_4$NaO$_3$S | 717 (M$^+$) | 648(3.64), 589(3.66), 542(3.93), 512(4.06), 413(5.43), 306(4.22) [methanol] | 8.7–9.0(m, 8H, β-pyrrole), 8.19–8.27(m, 8H: 6H$^o$-triphenyl + 2H-sulphonatophenyl), 7.77–7.82 (m, 11H: 9H, H$^m$, H$^p$-triphenyl + 2H sulphonatophenyl [methanol-d$_4$] |
| 24c | 69% | 29.1 | C$_{44}$H$_{29}$N$_4$NaO$_3$S | 717 (M$^+$) | 644(3.53), 588(3.68), 545(3.84), 511(4.13), 413(5.48) [methanol] | 8.62–8.76(m, 8H, β-pyrrole), 8.45(d, 2H, 4-sulphonatophenyl), 8.12–8.25(m, 6H, H$^o$-triphenyl), 7.49–7.99(d+m, 9H, H$^m$, H$^p$-triphenyl+d, 2H, 4-sulphonatophenyl) [methanol-d$_4$] |

TABLE 3

Monochlorophthalocyanines and 6-(chlorophenyl)-10,15,20-triphenylporphyrins

| No. | Yield | $R_f$ [toluene—ethyl acetate, 9:1] | Molecular formula | FAB-MS [HR-MS], m/z |
|---|---|---|---|---|
| 6a | 25% | 0.75 | $C_{44}H_{39}N_8ClZ$ | 779(10+, M+), 764(30%, M+—$CH_3$), 749(10%, M+—2$CH_3$), 734(20%, M+—3$CH_3$), 722(100%, M+—$C_4H_9$) |
| 6b | 33% | 0.75 | $C_{44}H_{39}N_8ClZn$ | 779(10%, M+), 734(20%, M+—3$CH_3$), 722(100%, M+—$C_4H_9$), 703(35%, M+—$C_4H_9$—$CH_3$) |
| 6c | 38% | 0.68 | $C_{44}H_{39}ClCuN_8$ | 778(15%, M+), 721(100%, M+—$C_4H_9$) |
| 11 | 18% | 0.42* | $C_{56}H_{45}ClN_8Zn$ | 929(M+) |
| 16 | 28% | 0.72 | $C_{48}H_{41}ClN_8Zn$ | 829(M+) |
| 22 | 25% | 0.25 | $C_{32}H_3ClF_{12}N_8Zn$ | 827(M+) |
| 25a | 30% | 0.8 | $C_{44}H_{29}ClN_4$ | [648.2073 ± 0.0019, theor. 648.2081] |
| 25b | 45% | 0.8 | $C_{44}H_{29}ClN_4$ | [648.2067 ± 0.0019, theor. 648.2081] |
| 25c | 15% | 0.8 | $C_{44}H_{29}ClN_4$ | [648.2073 ± 0.0019, theor. 648.2081] |

*Toluene—pyridine 20:1.

EXAMPLE 9

Photodynamic activity of a monosulphonated Pc against an experimental mouse tumour Photosensitizer Zinc dodecafluoro-4-sulphophthalocyanine ($ZnPcF_{12}S_1$) was prepared in accordance with the process of the present invention and was formulated at a concentration of 0.1 mM n 10% Cremophort™ EL (Sigma) 3% propane-1,2-diol emulsion in saline and stored in the dark at 0.5° C. prior to use.

Tumour model

Male Balb/c mice (6–7 weeks old, Charles River Inc.), were inoculated in the right hind with $2 \times 10^5$ EMT-6 murine mammary tumour cells suspended in 0.05 ml of Waymouth's medium (Gibco Inc.). At 6 days postinoculation, the tumours were about 2 mm in diameter and this time point was selected for therapeutic intervention.

Treatment protocol

Tumour bearing mice were i.v. injected with 0.1–1.0 μmol/kg (0.087–0.87 mg/kg) $ZnPcF_{12}S_1$ (n=10). Twenty-four hours after dye injection tumours were exposed to a 8 mm circular red light beam (400 $J/cm^2$ at a fluence rate of 200 $mW/cm^2$, 650–700 nm) delivered by a 1000 W Xenon lamp, equipped with a 10 cm water filter and LS700 and LL650 (trademarks) Corion filters. Under these conditions, no hyperthermia occurred during illumination.

Tumour response

Even at the lowest dose of 0.1 μmol/kg, complete tumour necrosis in 100% of treated animals was observed within 3 days following PDT. The involvement of direct tomour cell kill during the photodynamic process was provided via the i.v. injection of 2 mg fluorescein (trademark) (in 0.2 ml of 0.154 Saline) immediately after PDT, revealing that the microvasculature in the tomour tissue was unaffected. This mechanism of tomour necroses contrasts that observed with Photofrin II (trademark, QLT Inc., Vancouver, Canada), e.g. which acts mainly through inducing extensive vascular statis during PDT. The latter phenomenon with Photofrin II (trademark) was confirmed in our tomour model using the fluorescein exclusion test. It should also be noted that in order to induce tomour response similar to our model, the Photofrin II (trademark) product required doses one order of magnitude higher, i.e. in the order of 2–5 mg/kg. It appears that Photofrin II consists of a mixture of haematoporphyrin dimers and oligomers lacks in purity, tumour localization and photochemical properties when compared to Pc's obtained by the process of the present invention.

Scheme 1 Reagents and conditions: i, $Zn(OAc)_2 \cdot 2H_2O$ or CuCl; ii, $Na_2S \cdot 9H_2O$ in DMF/THF; iii, $NaNO_2$, HCl, 0° C.; iv, $SO_2$ in AcOH, $CuCl_2$; v, 1N NaOH.

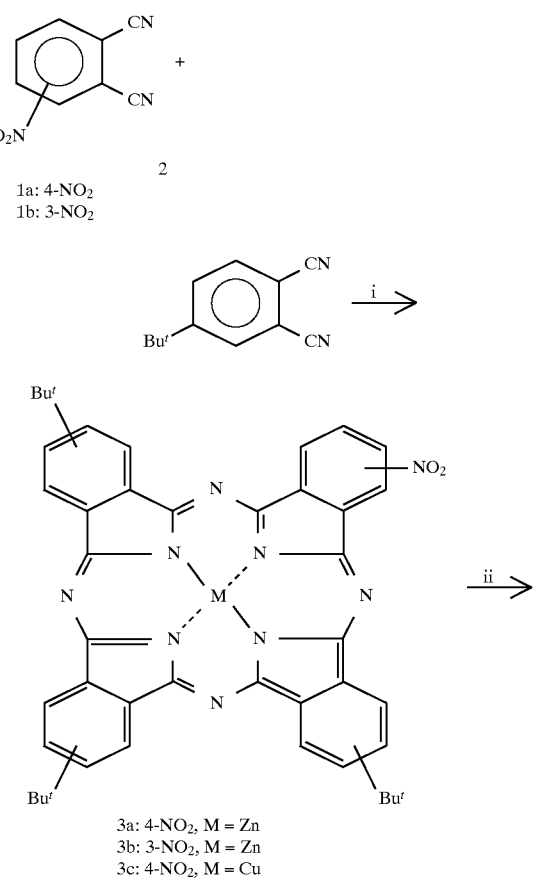

1a: 4-$NO_2$
1b: 3-$NO_2$

3a: 4-$NO_2$, M = Zn
3b: 3-$NO_2$, M = Zn
3c: 4-$NO_2$, M = Cu

Scheme 1 Reagents and conditions: i, Zn(OAc)$_2$.2H$_2$O or CuCl; ii, Na$_2$S.9H$_2$O in DMF/THF; iii, NaNO$_2$, HCl, 0° C.; iv, SO$_2$ in AcOH, CuCl$_2$; v, 1N NaOH.

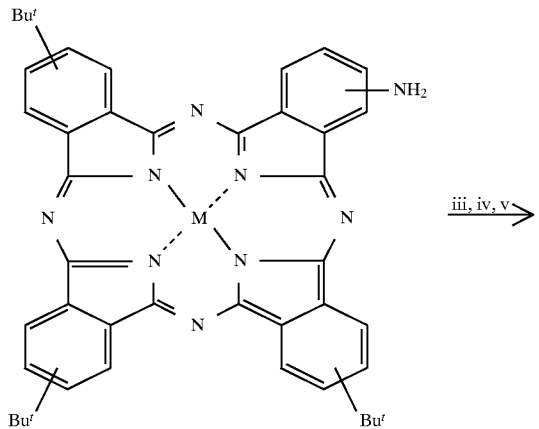

4a: 4-NH$_2$, M = Zn
4b: 3-NH$_2$, M = Zn
4c: 4-NH$_2$, M = Cu

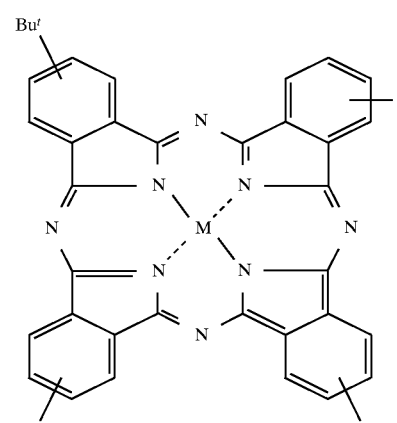

5a: R = 4-SO$_3$Na, M = Zn   6a: R = 4-Cl, M = Zn
5b: R = 3-SO$_3$Na, M = Zn   6b: R = 3-Cl, M = Zn
5c: R = 4-SO$_3$Na, M = Cu   6c: R = 4-Cl, M = Cu

Scheme 2 Reagents and conditions: i, Zn(OAc)$_2$.2H$_2$O; ii, Na$_2$S.9H$_2$O in DMF/THF iii, NaNO$_2$, HCl, 0° C.; iv, SO$_2$ in AcOH, CuCl$_2$; v, 1N NaOH 1a + 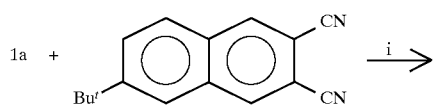 $\xrightarrow{i}$

7

Scheme 2 Reagents and conditions: i, Zn(OAc)$_2$.2H$_2$O; ii, Na$_2$S.9H$_2$O in DMF/THF iii, NaNO$_2$, HCl, 0° C.; iv, SO$_2$ in AcOH, CuCl$_2$; v, 1N NaOH

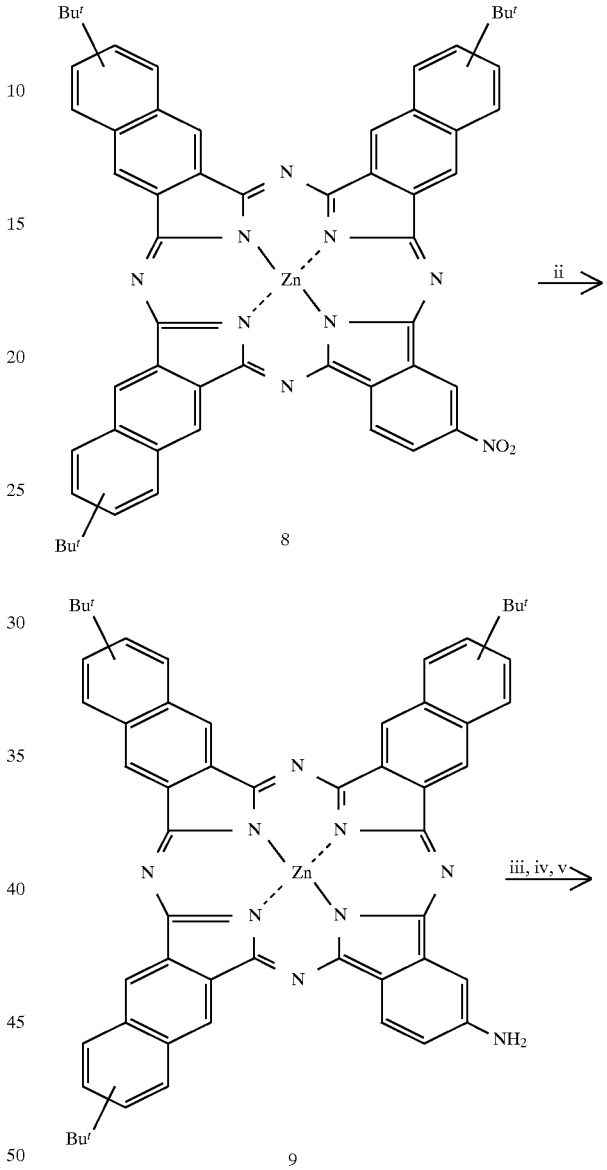

-continued

Scheme 2 Reagents and conditions: i, Zn(OAc)₂.
2H₂O; ii, Na₂S.9H₂O in DMF/THF iii, NaNO₂,
HCl, 0° C.; iv, SO₂ in AcOH, CuCl₂; v, 1N NaOH

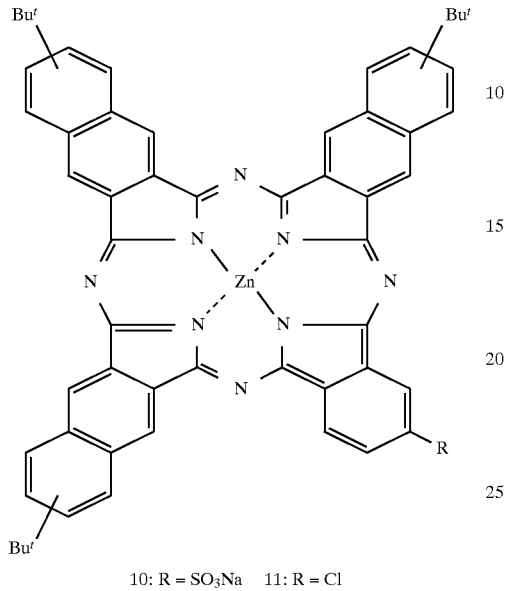

10: R = SO₃Na    11: R = Cl

Scheme 3 Reagents and conditions: i, Zn(OAc)₂O; ii,
Na₂S.9H₂O in DMF/THF; iii, NaNO₂, HCl, 0° C.;
iv, SO₂ in AcOH, CuCl₂; v, 1N NaOH

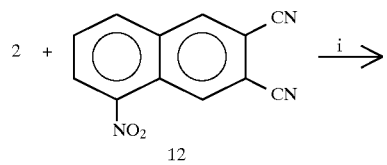

12

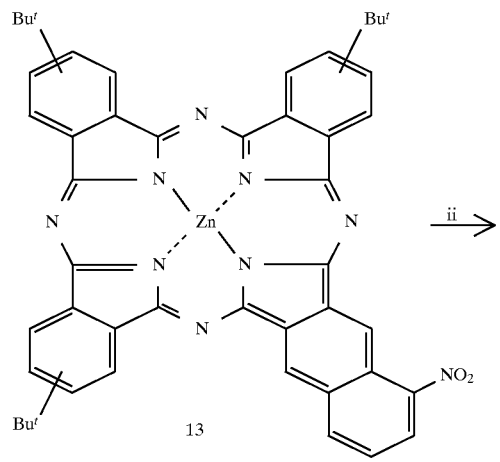

13

-continued

Scheme 3 Reagents and conditions: i, Zn(OAc)₂O; ii,
Na₂S.9H₂O in DMF/THF; iii, NaNO₂, HCl, 0° C.;
iv, SO₂ in AcOH, CuCl₂; v, 1N NaOH

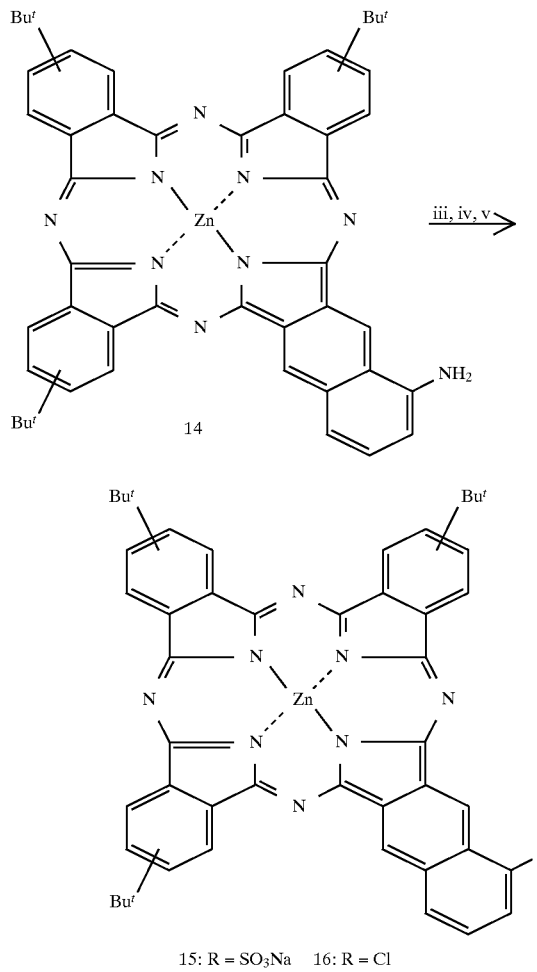

14

15: R = SO₃Na    16: R = Cl

Scheme 4 Reagents and conditions: i, Zn(OAc)₂.2H₂O;
ii, 5M HCl, reflux; iii, NaNO₂, HCl, 0° C.; iv, SO₂ in
AcOH, CuCl; v, 1N NaOH.

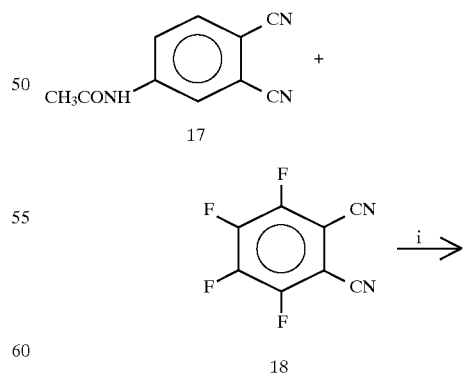

17

18

-continued
Scheme 4 Reagents and conditions: i, Zn(OAc)$_2$.2H$_2$O; ii, 5M HCl, reflux; iii, NaNO$_2$, HCl, 0° C.; iv, SO$_2$ in AcOH, CuCl; v, 1N NaOH.
Scheme 5 Reagents and conditions: i, NaNO$_2$, HCl, 0° C.; ii, SO$_2$ in AcOH, CuCl$_2$; iii, 1N NaOH; iv, Zn(OAc)$_2$.2H$_2$O in MeOH.
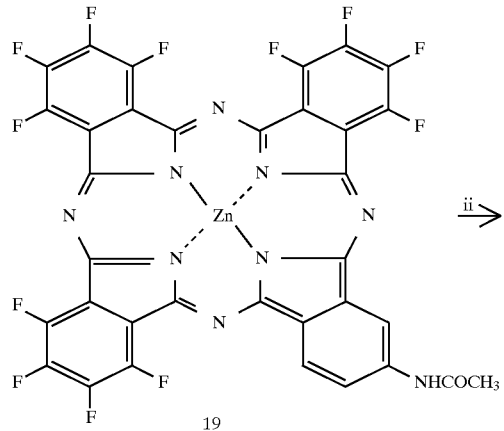
19
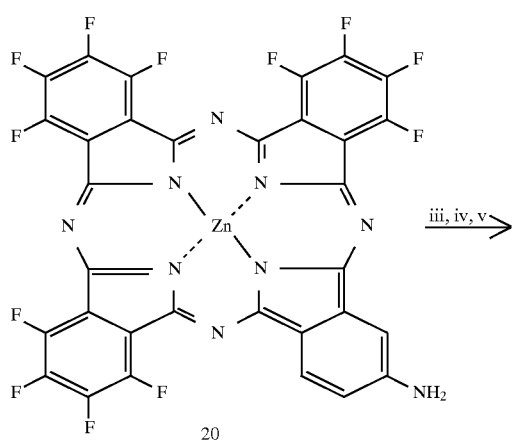
20
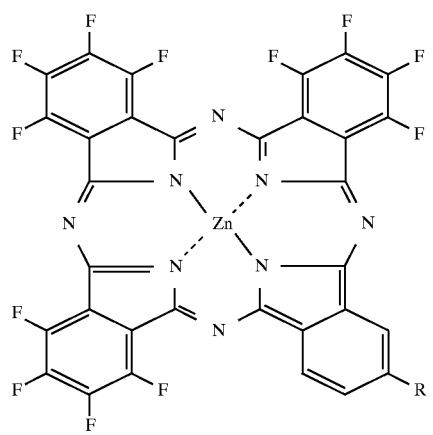
21: R = SO$_3$Na  22: R = Cl
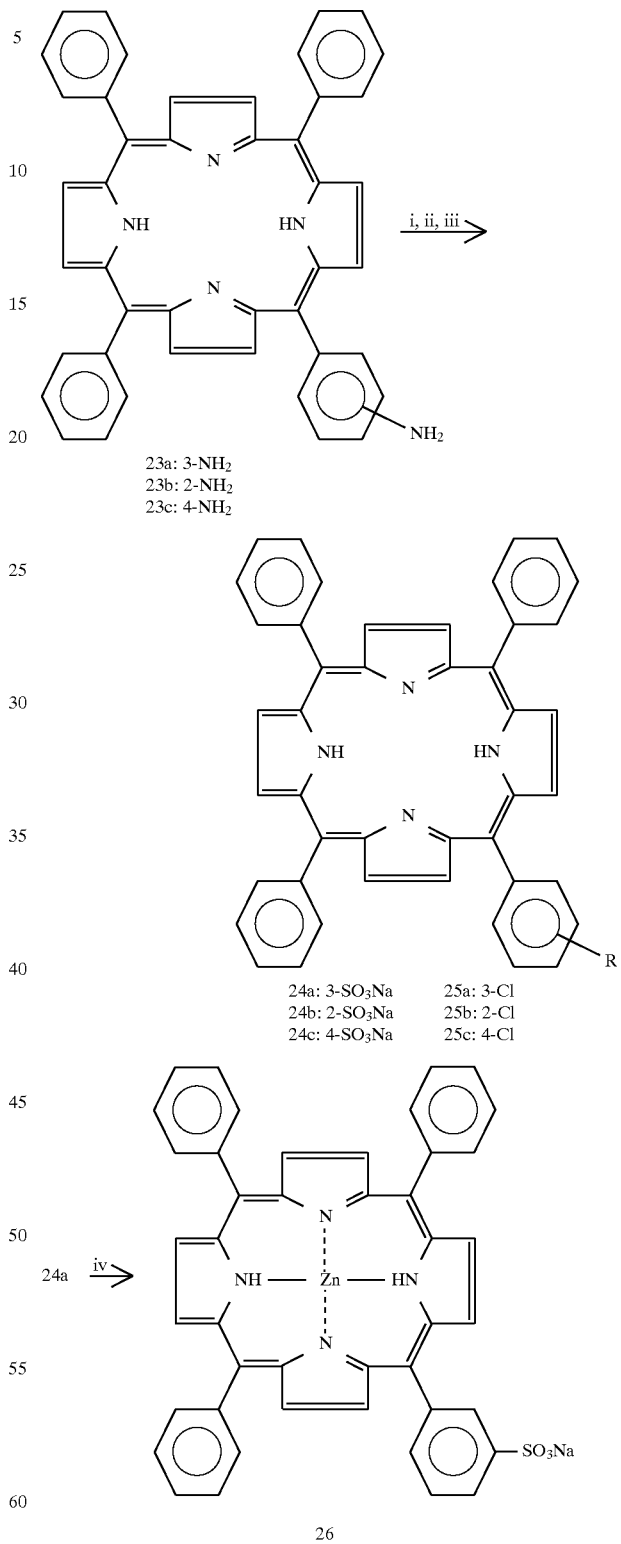
23a: 3-NH$_2$
23b: 2-NH$_2$
23c: 4-NH$_2$
24a: 3-SO$_3$Na   25a: 3-Cl
24b: 2-SO$_3$Na   25b: 2-Cl
24c: 4-SO$_3$Na   25c: 4-Cl
26

Although the invention has been described above with respect with one specific form, it will be evident to a person skilled in the art that it may be modified and refined in various ways. It is therefore wished to have it understood that the present invention should not be limited in scope, except by the terms of the following claims.

The embodiments of the invention in which an exclusive property or privilege is claimed are defined as follows:

1. A method for the preparation of single positional isomers of monosulphonated metallo derivatives of the following general formula:

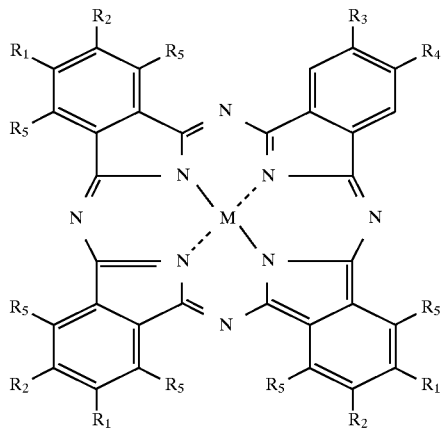

wherein
M is Zn (II), AL(III), Ga(III) and Sn(IV); and
wherein the substituents $R_1$ to $R_5$ are optionally selected from the groups consisting of:
$R_1$, $R_2$ and $R_5$ are H, halogen, $Si(CH_3)_3$, and alkyl, $R_3$ and $R_4$ are $SO_3Na$ and $SO_2Cl$;
$R_1$,$R_2$ is

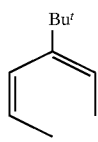

$R_3$ and $R_4$ are $SO_3Na$ and $SO_2Cl$ and
$R_5$ is H; and
$R_1$ and $R_2$ are H and $Bu^t$, $R_3$, $R_4$, is

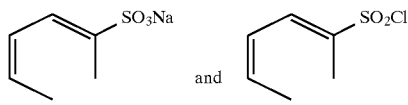

and $R_5$ is H;
and sulphonamides thereof,
said method comprising the steps of:
(a) obtaining a basic macrocycle by condensation of two precursors of similar solubility, one of said precursors containing a lipophilic substituent and the other said precursor containing a nitro group;
(b) converting said basic macrocycle to a monodiazonium salt by reducing the nitro group to an amine group followed by diazotization;
(c) sulphonating the basic macrocycle by mixing a solution containing sulphonate substituents and a cupric ion catalyst to a suspension or solution of said monodiazonium salt to cause a reaction yielding a mixture of compounds including monosulphochlorinated and monochlorinated derivates;
(d) hydrolysing said mixture; and
(e) recovering from the hydrolysed mixture the single isomeric monosulphonated compound;

wherein said method introduces said sulphonate substituents as the final step in the reaction sequence.

2. A method for the preparation of single positional isomers of monosulphonated metallo derivatives of compounds selected from the group consisting of monosulphophthalocyanines of the following general formula:

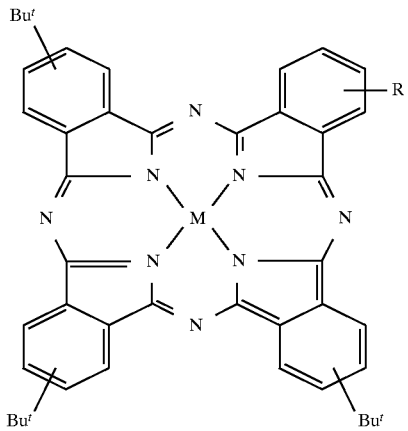

wherein

M is Zn (II), AL(III), Ga(III), Sn(IV); and
R is 3-$SO_3Na$, 4-$SO_3Na$, $SO_2Cl$ and $SO_2NHR$;
monosulphonaphthobenzoporphyrazines of the following general formula:

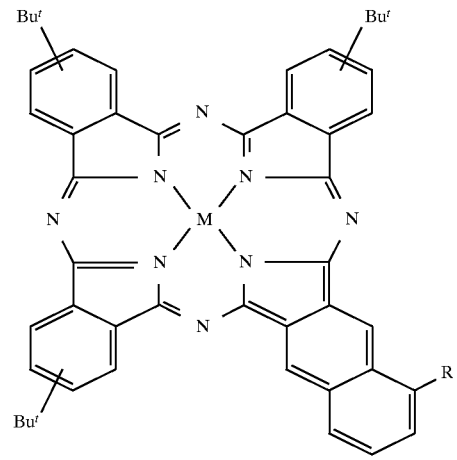

wherein

M is as defined above and R is SO₃Na, SO₂Cl and SO₂NHR₁;

(R₁ is H or alkyl);

and monosulphotetraphenylporphyrins of the following general formula:

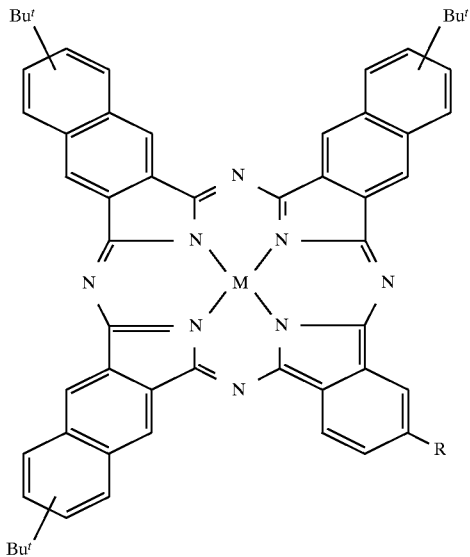

wherein

M is as defined above and R is SO₃Na, SO₂Cl and SO₂NHR₁;

(R₁ is H or alkyl);

and salts and sulphonamides thereof, said method comprising the steps of:
(a) obtaining a basic macrocycle by condensation of two precursors of similar solubility, one of said precursors containing a lipophilic substituent and the other said precursor containing a nitro group;
(b) converting said basic macrocycle to a monodiazonium salt by reducing the nitro group to an amine group followed by diazotization;
(c) sulphonating the basic macrocycle by mixing a solution containing sulphur dioxide and a cupric ion catalyst to a suspension or solution of said monodiazonium salt to cause a reaction yielding a mixture of compounds including monosulphochlorinated and monochlorinated derivates;
(d) hydrolysing said mixture;
(e) recovering from the hydrolysed mixture the single isomeric monosulphonated compound wherein said method introduces said sulphonate substituents as the final step in the reaction sequence.

3. A method for the preparation of single positional isomers of monosulphonated metallo derivatives of compounds selected from the group consisting of monosulphophthalocyanines of the following general formula:

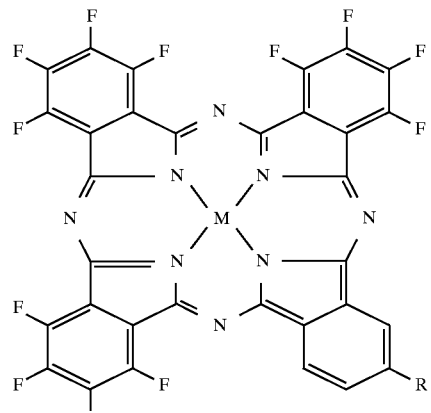

wherein

M is Zn (II), AL(III), Ga(III), Sn(IV); and
R is 3-SO₃Na, 4-SO₃Na and SO₂Cl;
and salts thereof,
said method comprising the steps of:
(a) obtaining a basic macrocycle by condensation of two precursors of similar solubility, one of said precursors containing fluoro substituents and the other said precursor containing a nitro group;
(b) converting said basic macrocycle to a monodiazonium salt by reducing the nitro group to an amine group followed by diazotization;
(c) sulphonating the basic macrocycle by mixing a solution containing sulphur dioxide and a cupric ion catalyst to a suspension or solution of said monodiazonium salt to cause a reaction yielding a mixture of compounds including monosulphonated and monochlorinated derivates;
(d) hydrolysing said mixture;
(e) recovering from the hydrolysed mixture the single isomeric monosulphochlorinated compound, wherein said method introduces said sulphonate substituents as the final step in the reaction sequence.

4. A method for the preparation of single positional isomers of monosulphonated metallo derivatives of compounds selected from the group consisting of monosulphotetraphenylporphyrins of the following general formula:

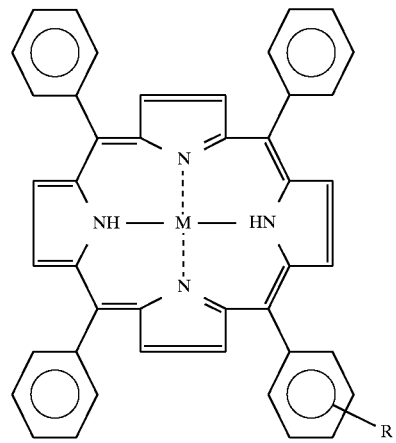

wherein

M is HH or Zn (II); and

R is 2-, 3- or 4-SO$_3$Na, SO$_2$Cl and SO$_2$NHR;
and salts or sulphonamides thereof,
said method comprising the steps of:
- (a) obtaining a basic macrocycle by condensation of benzaldehyde and appropriate nitrobenzaldehyde with pyrrole;
- (b) converting said basic macrocycle to a monodiazonium salt by reducing the nitro group to an amine group followed by diazotization;
- (c) sulphonating the basic macrocycle by mixing a solution containing sulphur dioxide and a cupric ion catalyst to a suspension or solution of said monodiazonium salt to cause a reaction yielding a mixture of compounds including monosulphonated and monochlorinated derivates;
- (d) hydrolysing said mixture;
- (e) recovering from the hydrolysed mixture the single isomeric monosulphonated compound, wherein said method introduces said sulphonate substituents as the final step in the reaction sequence.

5. A process as in any one of claims 1 to 4, wherein step (c) is conducted under vigorous agitation, said solution consists of sulphur dioxide in acetic acid mixed with a solution of the cupric catalyst.

6. A process as in any one of claims 1 to 4, wherein step (d) is conducted in 1N NaOH.

7. A process as in any one of claims 1 to 4, wherein step (d) is conducted in 1N HCl.

8. A process as in any one of claims 1 to 4, wherein step (e) is conducted by chromatography.

* * * * *

UNITED STATES PATENT AND TRADEMARK OFFICE
CERTIFICATE OF CORRECTION

PATENT NO. : 5,889,181
DATED : March 30, 1999
INVENTOR(S) : Kudrevich et al.

It is certified that error appears in the above-identified patent and that said Letters Patent is hereby corrected as shown below:

Title page,
Item [30] should read:

-- [30] Foreign Application Priority Data
Aug. 25, 1994 [CA] Canada ............... 2,130,853 --

Signed and Sealed this

Fourteenth Day of May, 2002

Attest:

Attesting Officer

JAMES E. ROGAN
Director of the United States Patent and Trademark Office